J. C. R. ABERNATHY.
STOVE CASING.
APPLICATION FILED DEC. 17, 1919.
1,357,432. Patented Nov. 2, 1920.
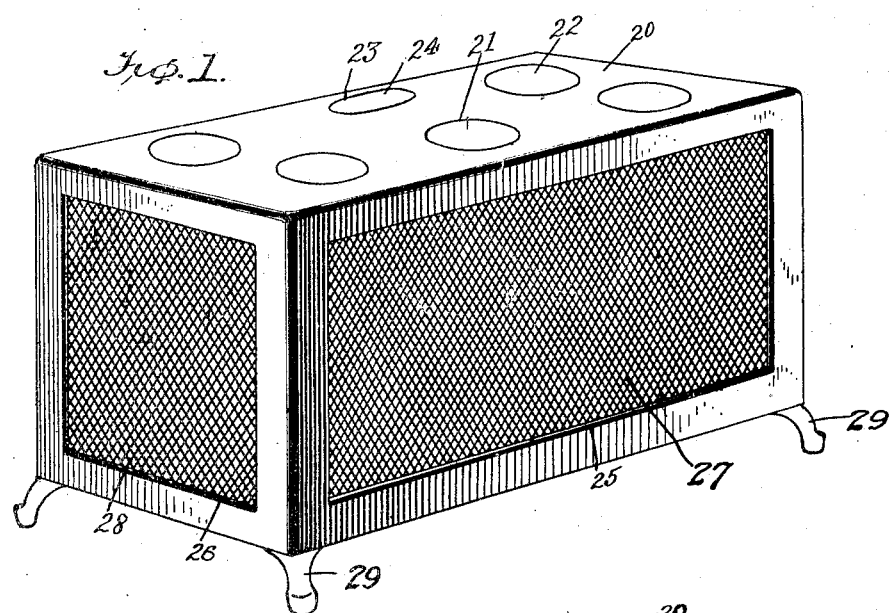
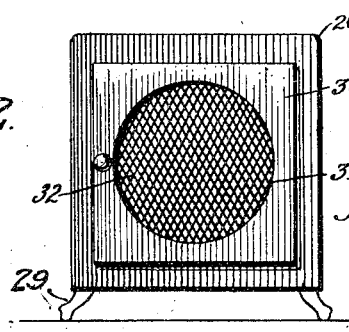

UNITED STATES PATENT OFFICE.

JAMES CARROLL ROSS ABERNATHY, OF EVANSTON, ILLINOIS.

STOVE-CASING.

1,357,432.  Specification of Letters Patent.  Patented Nov. 2, 1920.

Application filed December 17, 1919. Serial No. 345,602.

*To all whom it may concern:*

Be it known that I, JAMES C. R. ABERNATHY, a citizen of the United States, and a resident of Evanston, in the county of Cook and State of Illinois, have invented certain new and useful Improvements in Stove-Casings, of which the following is a specification.

My invention is an improvement in stove casings and has for its object the provision of a casing for covering a cook stove to conceal the mechanical features thereof while not interfering with the passage of heated air and not interfering with the use of the stove in its cooking capacity, the casing being formed with holes registering with the holes in the top of the stove and closable by removable lids.

In the drawings:

Figure 1 is a perspective view of the device.

Fig. 2 is an end elevation of a modified form.

Referring more particularly to the drawing, the numeral 20 designates a casing having a top which is provided with circular openings 21 closed by lids 22. An opening 23 is also provided for a draft pipe, if desired, and this opening, when not in use, is closed by a lid 24. The front, rear and end walls have panel openings 25 and 26, respectively, which are closed by sheets 27 and 28 of perforate material, as, for instance, wire mesh. These openings 21 and 23 in the top of the casing are designed to register with the stove openings and the draft opening of the stove. When in use the lids 22 and 24 are removed, while when the device is not in use the lids are placed in their respective openings for closing the same. The casing 20 is preferably supported upon legs 29, as shown.

In Fig. 2 there is shown a construction adapted for a stove having an oven. In this arrangement the casing 20, which is of the same construction as that shown in Fig. 1, has in one end a door 30 provided with a circular opening 31 closed by a sheet 32 of perforate material. This door 30 registers with the oven door.

The casing is composed of thin sheet material stamped to shape, and the perforate material may be held in place over the openings in any suitable or desired manner. The casing completely covers and conceals the stove, making an ornamental piece of furniture instead of an ugly piece. The frame of the casing may be of any desired material, as, for instance, metal or wood, and if of wood it may be polished like a piece of furniture. The casing takes away the mechanical aspect of a stove and it is easier to clean and keep clean than the stove. Openings for the exit of heated air may be in any design desired.

I claim:

A rectangular casing adapted to fit down over and about a cook stove and to be supported by resting upon the top thereof, the bottom of the casing being open and the sides being formed with open panels covered with wire screen, the top of the casing being formed with holes registering with the usual holes in the top of the stove, and lids normally closing the holes in the casing.

JAMES CARROLL ROSS ABERNATHY.